United States Patent
Matsuo et al.

(10) Patent No.: US 10,549,806 B2
(45) Date of Patent: Feb. 4, 2020

(54) EXTERIOR PART OF SADDLED VEHICLE

(71) Applicant: HONDA MOTOR CO., LTD., Minato-Ku, Tokyo (JP)

(72) Inventors: Tomoya Matsuo, Wako (JP); Kenji Konno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 117 days.

(21) Appl. No.: 15/711,512

(22) Filed: Sep. 21, 2017

(65) Prior Publication Data

US 2018/0093730 A1    Apr. 5, 2018

(30) Foreign Application Priority Data

Sep. 30, 2016  (JP) .................................. 2016-194733

(51) Int. Cl.
*B62J 17/00* (2006.01)
*B62J 17/02* (2006.01)
*B62J 23/00* (2006.01)

(52) U.S. Cl.
CPC .............. *B62J 17/00* (2013.01); *B62J 17/02* (2013.01); *B32B 2262/0261* (2013.01); *B32B 2262/106* (2013.01); *B32B 2307/102* (2013.01); *B32B 2307/402* (2013.01); *B62J 23/00* (2013.01)

(58) Field of Classification Search
CPC ... B32B 5/024; B32B 5/08; B32B 5/22; B62J 15/00; B62J 17/00; B62J 17/02; B62J 17/06; B62K 11/00; B62K 19/16
USPC .................................................. 296/78.1, 198
See application file for complete search history.

(56) References Cited

U.S. PATENT DOCUMENTS

| 2005/0022625 | A1 | 2/2005 | Nonoshita |
| 2014/0346845 | A1 | 11/2014 | Renner |
| 2015/0060177 | A1 | 3/2015 | Matsushima et al. |
| 2015/0176425 | A1 | 6/2015 | Caulfeild et al. |

(Continued)

FOREIGN PATENT DOCUMENTS

| DE | 3310918 A1 * | 10/1984 | .............. B62J 17/00 |
| EP | 2 881 313 A1 | 6/2015 | |

(Continued)

OTHER PUBLICATIONS

English translation of DE 33 10 918; reteived on Mar. 13, 2018 via PatentTranslate located at www.epo.org. (Year: 2019).*

(Continued)

*Primary Examiner* — Jason S Daniels
(74) *Attorney, Agent, or Firm* — Carrier Blackman & Associates, P.C.; William D. Blackman; Joseph P. Carrier (57) ABSTRACT

A rear frame is formed of a laminate that includes a plurality of carbon fiber layers laminated one on top of another and hardened and integrated with each other by a plastic. A different color layer having a color different from a color of the carbon fiber layers is disposed between the carbon fiber layers in the laminate. When a carbon fiber layer on the outside is lost by a piece of flying gravel and a lost portion reaches the different color layer, a surface of the different color layer is exposed from the lost portion. An exposed portion having the different color can be easily recognized from the outside. The appearance of the exposed portion allows arrival of a replacement time of the rear frame to be recognized. As a result, it is possible to enable easy visual recognition of an optimum replacement timing.

16 Claims, 9 Drawing Sheets

(56) References Cited

U.S. PATENT DOCUMENTS

2016/0076494 A1 3/2016 Nishimura et al.
2016/0200387 A1 7/2016 Matsushima

FOREIGN PATENT DOCUMENTS

| JP | H11-29085 A | 2/1999 |
| JP | 2005-271350 A | 10/2005 |
| JP | 2006-264250 A | 10/2006 |
| JP | 2011-228552 A | 11/2011 |
| JP | 2015-110387 A | 6/2015 |

OTHER PUBLICATIONS

English translation of JP 2006-264250; retreived on Mar. 13, 2019 via J Plat Pat located at https://www.j-platpat.inpit.go.jp/web/all/top/BTmTopEnglishPage. (Year: 2019).*
Extended European search report dated Feb. 12, 2018 in the corresponding EP patent application 17193652.9.

* cited by examiner

EXTERIOR PART OF SADDLED VEHICLE

BACKGROUND OF THE INVENTION

Field of the Invention

The present invention relates generally to exterior parts such as rigid covering members for use in saddled vehicles including motorcycles and, more particularly, to an exterior part such as that formed of a carbon fiber reinforced plastic (hereinafter referred to as a CFRP).

Background Art

Installing an engine guard that covers an underside of an engine is known. The engine guard is an exterior part that covers an outer surface of a vehicle body. An exemplary known configuration includes an engine guard formed of an aluminum plate and an elastic member disposed on an inboard side in the vehicle body of the engine guard, thereby protecting the engine from, for example, gravel (see Patent Document 1—Japanese Patent Laid-open No. 2011-228552). Another known approach is to form part of the vehicle body of CFRP.

Patent Document 1

Japanese Patent Laid-open No. 2011-228552

The aluminum engine guard disclosed in Patent Document 1, while being highly rigid and lightweight, is subject to flying gravel hitting there against during traveling. The engine guard is then shaved off an outer surface thereof, thus offering reduced rigidity. In this case, the engine guard requires replacement. Necessity of replacement is, however, noticed only until a large loss is evident and recognition of an optimum replacement timing has been a difficult task to achieve. The same holds for an engine guard formed of, for example, a lightweight and highly rigid CFRP, instead of the aluminum or other metal. Even when the replacement time arrives due to, for example, wear from use over an extended period of time, a lost portion is not noticeable and visual recognition of the arrival of the replacement time has not been an easy job during servicing. The same holds for exterior parts for other uses. A need thus exists for ready recognition of a replacement time for exterior parts including the engine guard during servicing.

To achieve the foregoing object, an aspect of the present application provides an exterior part of a saddled vehicle. The exterior part is formed of a CFRP to constitute an outer surface of the saddled vehicle. The exterior part is formed from a laminate that includes a plurality of carbon fiber layers laminated one on top of another and hardened by a plastic. The laminate includes a different color layer having a color different from a color of the carbon fiber layers and disposed between the carbon fiber layers. When the carbon fiber layer in an outermost layer out of the carbon fiber layers in the laminate is lost by wear, for example, and the lost portion reaches the different color layer disposed inside, part of the different color layer is exposed from the lost portion. An exposed portion of the different color layer, because of the color thereof different from the others, can be easily recognized from the outside. The appearance of the different color layer allows arrival of a replacement time of the exterior part to be recognized.

Effects of the Invention

In the exterior part composed of the laminate formed of the CFRP, loss occurs in the carbon fiber layer on the outer surface side through, for example, wear caused by flying gravel. When the lost portion eventually reaches the different color layer disposed inside of the CFRP, the different color layer is exposed. The exposed portion of the different color layer is readily visible from the outside. The replacement time of the exterior part composed of the laminate formed of the CFRP can be precisely determined by disposing the different color layer such that the different color layer is exposed at the most appropriate time of replacement. Specifically, a replacement time advance notice function can be precisely exhibited by the exposure of the different color layer.

Figure 4A:
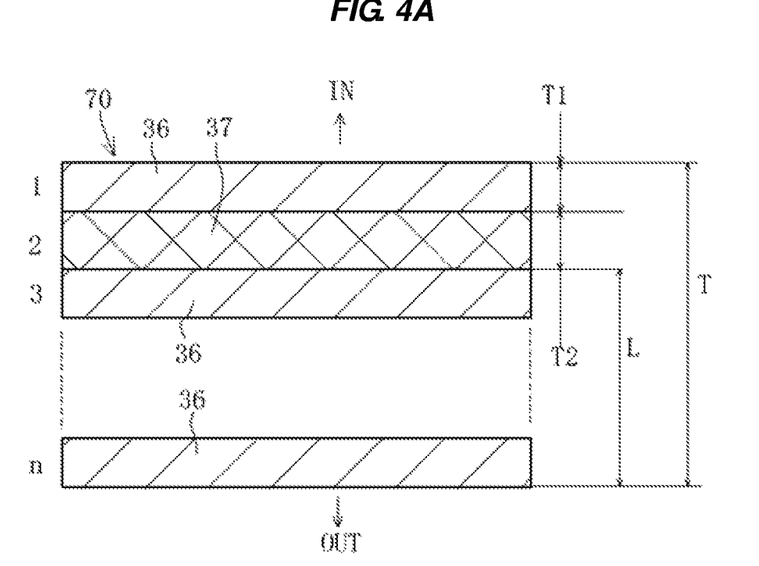
FIGS. 4A and 4B are schematic cross-sectional views taken along line 4-4 in FIG. 3.
Figure 4B:
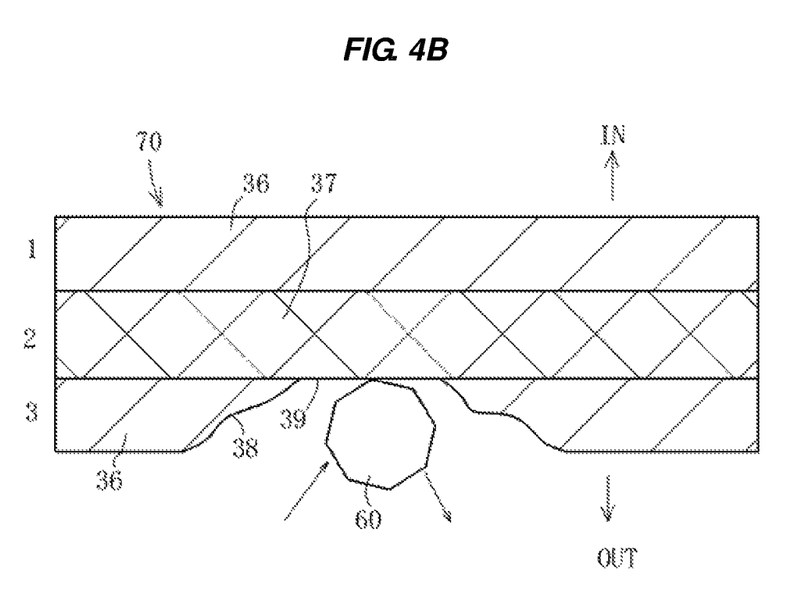
Figure 8:
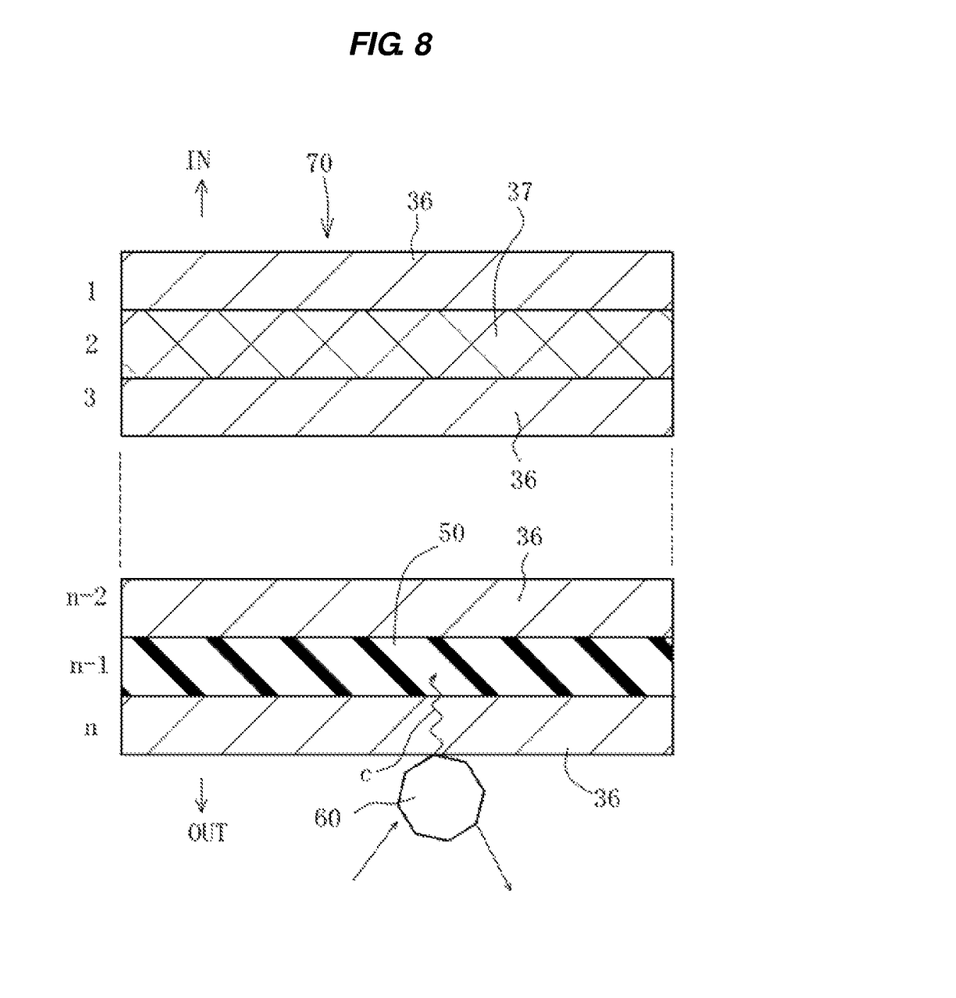
FIG. 8 is a schematic cross-sectional view taken along line 8-8 in FIG. 6.

A specific embodiment as applied to an off-road motorcycle as an exemplary saddled vehicle will be described below with reference to the accompanying drawings. Throughout the descriptions given hereunder, expressions indicating directions including upper and lower, left and right, and front and rear, mean the same directions as those in a vehicle. In FIGS. 4A, 4B, and 8, the arrow IN indicates an inboard side in the vehicle body and the arrow OUT indicates an outboard side in the vehicle body with respect to a laminate constituting a CFRP.

Figure 1:
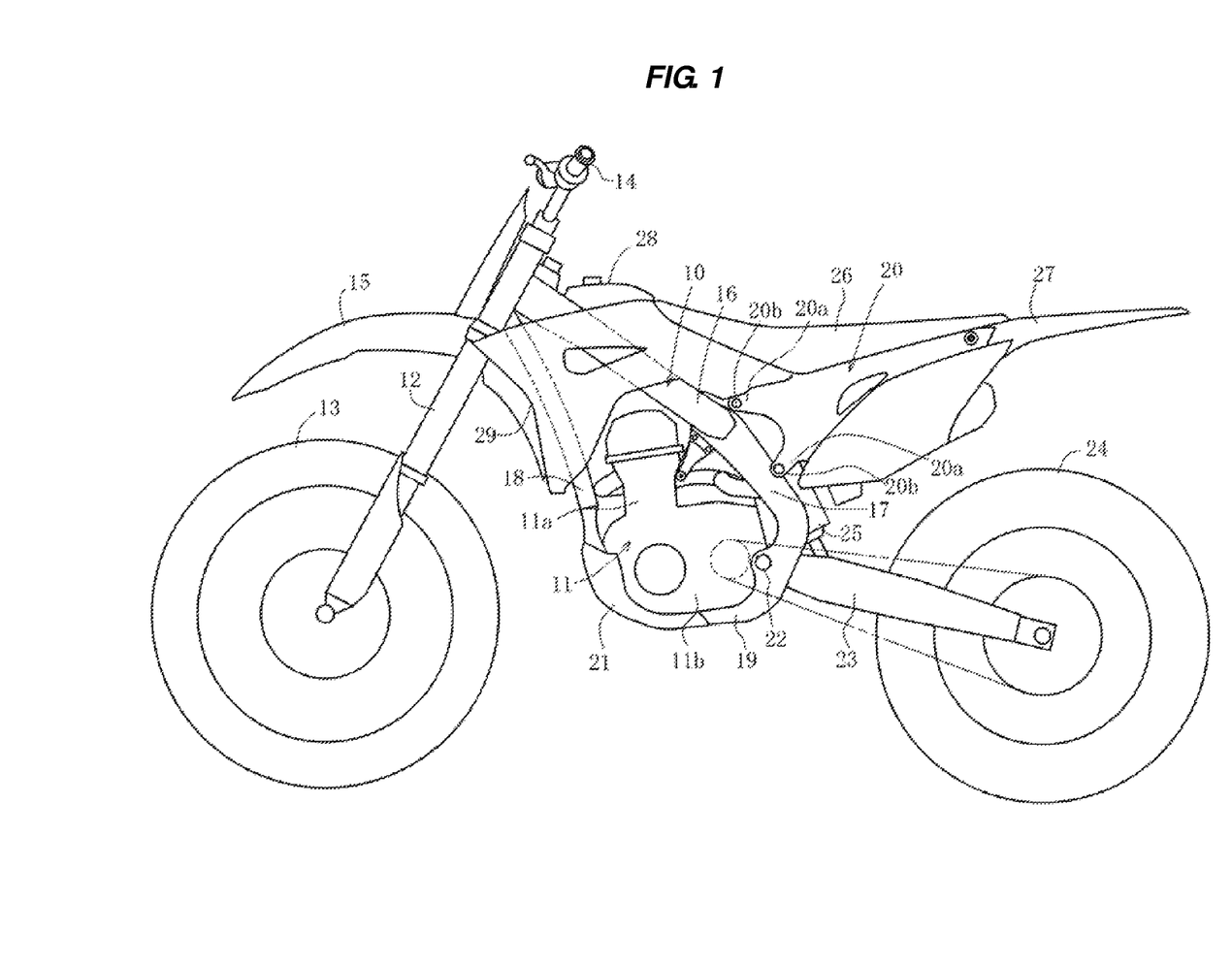
FIG. 1 is a side elevational view depicting an off-road motorcycle according to an embodiment of the present invention.

As depicted in FIG. 1, the motorcycle is an off-road motorcycle including a slim vehicle body having a relatively tall vehicle height and a light weight. The motorcycle has a particular configuration of an off-road vehicle including an engine 11 supported at a center in a vehicle body frame 10. The configuration achieves agile vehicle operability through mass concentration in which heavy parts are disposed compactly and centrally in the center of the vehicle. The engine 11 includes a cylinder 11a and a crankcase 11b.

A front fork 12 having a long stroke is rotatably supported at a front end portion of the vehicle body frame 10. A front wheel 13 having a relatively large diameter is supported at a lower end of the front fork 12 and is steered by a handlebar 14. A front fender 15 is disposed at a high level superior to, and with a sufficient gap from, the front wheel 13.

The vehicle body frame 10 has a compact configuration forming a substantially triangular closed loop that is long vertically in a side view. The vehicle body frame 10 includes a main frame 16, a center frame 17, a down frame 18, and a lower frame 19. The main frame 16 extends along an area superior to the engine 11 obliquely downwardly toward the rear. The center frame 17 extends from a rear end portion of the main frame 16 to an area posterior to the engine 11 and further extends downwardly. The down frame 18 extends along an area anterior to the engine 11 obliquely downwardly to the rear. The lower frame 19 connects respective lower ends of the down frame 18 and the center frame 17 to thereby extend along an area inferior to the engine 11.

A rear frame 20 has front end portions 20a fastened with an upper portion of the center frame 17 by bolts 20b. The rear frame 20 is an exemplary exterior part formed of the CFRP in the present application. The rear frame 20 extends from the center frame 17 obliquely upwardly toward the rear and functions as part of a rear fender for a rear wheel 24 (to be described later).

An engine guard 21 is disposed to extend from a lower portion of the down frame 18 to a front portion of the lower frame 19. The engine guard 21 is another exemplary exterior part formed of the CFRP in the present application. The engine guard 21 covers an area of the crankcase 11b of the engine 11 from a front portion to an anterior portion of a bottom portion of the crankcase 11b, thereby protecting the engine 11 from, for example, flying gravel.

A rear arm 23 has a front end swingably supported by a pivot 22 on the center frame 17. The rear wheel 24 is supported at a rear end of the rear arm 23. Reference symbol 25 denotes a rear cushion. The rear cushion 25 has specifications compatible with a large stroke of the rear wheel 24.

A seat 26 is supported on the rear frame 20. The rear frame 20 functions as part of the rear fender. A rear portion rear fender 27 extends long from a rear end of the rear frame 20 toward the rear. The rear portion rear fender 27, together with part of the rear frame 20, constitutes the rear fender. The rear portion rear fender 27 is disposed at a high position so as to cover an area superior to the rear wheel 24 in a stroke range of the rear wheel 24 that swings vertically about the pivot 22. The rear portion rear fender 27 thereby enables the large stroke of the rear wheel 24.

A fuel tank 28 is disposed anterior to the seat 26. The fuel tank 28 is supported on the main frame 16 at a position superior to the cylinder 11a. Reference symbol 29 denotes a side cowl. The side cowl 29 is an exemplary exterior part and is provided in pairs on either side in a vehicle width direction. Each of the side cowls 29 has part supported on a lateral surface of the fuel tank 28.

Figure 2:
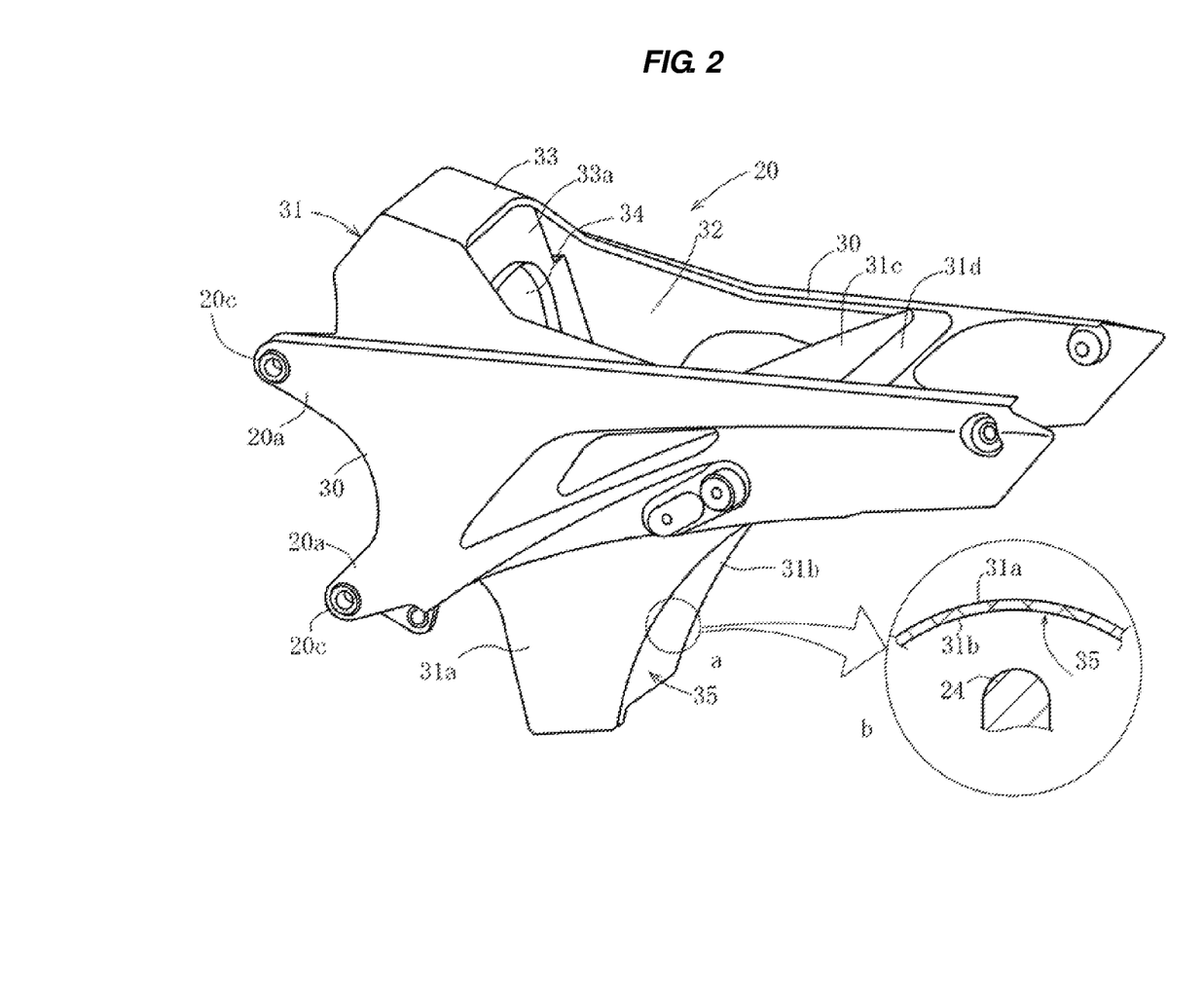
FIG. 2 is a perspective view depicting a rear frame (exterior part) disposed in the vehicle.
Figure 3:
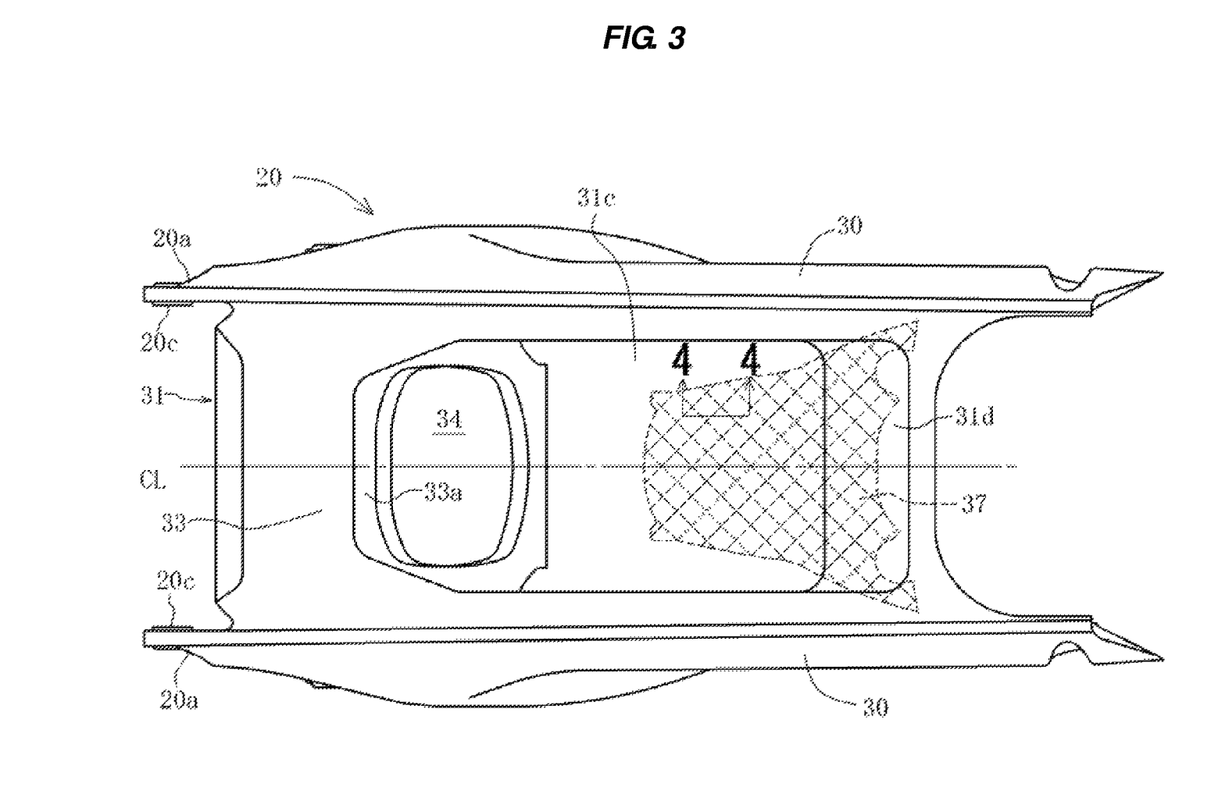
FIG. 3 is a plan view depicting the rear frame.

The CFRP exterior parts will be described in detail below. The rear frame 20 will be described below with reference to FIGS. 2, 3, and 4A and 4B. As depicted in FIGS. 2 and 3, the rear frame 20 includes CFRP left and right lateral portions 30 and a CFRP central portion 31 disposed between, and bonded integrally with, the lateral portions 30. The rear frame 20 serves as a seat rail for supporting a seat in a traditional vehicle body frame and an anterior side portion of a traditional rear fender.

The lateral portions 30 are provided in pairs, extending from front portions obliquely upwardly toward the rear. The lateral portions 30 have high rigidity, functioning similarly to, and in place of, the traditional seat rail formed of, for example, a metal pipe. Front end portions 20a are molded integrally with each of the lateral portions 30 at upper and lower ends at the front ends of each of the lateral portions 30. Additionally, the front end portions 20a each have a boss 20c of a through hole through which a bolt 20b is to be installed.

The left and right lateral portions 30 and the central portion 31 form a recessed space that opens upwardly. The recessed space constitutes an air cleaner chamber 32. A front side cross portion 33 is disposed anterior to the air cleaner chamber 32. The front side cross portion 33 continuously joins front end portions of the left and right lateral portions 30. The front side cross portion 33 has a back surface 33a constituting a front surface wall of the air cleaner chamber 32. The back surface 33a has an opening 34.

The air cleaner chamber 32 houses an air cleaner filter (not depicted) in a position of facing the opening 34. Clean air is supplied through a connecting tube (not depicted) connected with the opening 34 to the cylinder 11a disposed anterior to the rear frame 20. Specifically, the rear frame 20 serves also as part of the air cleaner.

The central portion 31 is disposed between the left and right lateral portions 30. Part of the central portion 31 constitutes a box portion 31a that protrudes long downwardly from the lateral portions 30 at a central portion in an anterior-posterior direction of the rear frame 20. The interior space of the box portion 31a is continuous with the air cleaner chamber 32, forming part of the air cleaner chamber 32 and contributing to a greater capacity of the air cleaner chamber 32.

The box portion 31a has a back surface 31b facing an outer peripheral surface of the rear wheel 24. The back surface 31b is formed into a recessed curved surface and is thus curved to follow along a circumferential direction of the rear wheel 24. Additionally, as depicted in an enlarged portion b that represents an enlarged view of a transverse cross section of portion a in FIG. 2, the back surface 31b has also a recessed curved surface curved in the vehicle width direction along the curved surface of a tire surface of the rear wheel 24. It is noted that the position of the rear wheel 24 relative to the back surface 31b in the enlarged portion b is depicted for reference purpose only.

The central portion 31 has a rear portion that constitutes a rear portion side bottom surface 31c of the air cleaner chamber 32. The rear portion side bottom surface 31c is an inclined surface inclined obliquely upwardly toward the rear. The central portion 31 has a rear end portion constituting a rear cross portion 31d that connects respective rear end portions of the left and right lateral portions 30. The rear cross portion 31d has a flat surface and joins a rear end of the rear portion side bottom surface 31c.

The rear portion side bottom surface 31c has a bottom surface that is a recessed curved surface continuous with the back surface 31b of the box portion 31a. Thus, the back surface 31b of the box portion 31a and the bottom surface of the rear portion side bottom surface 31c together face the outer peripheral surface of the rear wheel 24 and form a continuous recessed curved surface following the outer peripheral surface of the rear wheel 24 to thereby constitute a front portion rear fender 35. Additionally, both the front portion rear fender 35 and the rear portion rear fender 27 form a recessed curved surface in the vehicle width direction as depicted in the enlarged portion b depicted in FIG. 2.

The front portion rear fender 35 is a front half portion of the rear fender. The front portion rear fender 35 and the rear portion rear fender 27 as a rear half portion (see FIG. 1) together constitute one rear fender for the rear wheel 24. The rear portion rear fender 27 may nonetheless be formed integrally with the rear frame 20. It should be noted that the direction in which the front portion rear fender 35 (rear fender) curves to extend in the anterior-posterior direction along the circumferential direction of the rear wheel 24 will be referred to as a circumferential direction of the fender.

Reference is made to FIG. 3. A different color layer 37 is laminated onto a portion mainly of the rear portion side bottom surface 31c of the central portion 31 corresponding to the front portion rear fender 35. The laminated portion is depicted by a cross-hatched range in FIG. 3. The cross-hatched range also represents a range that is formed long in the anterior-posterior direction from the front end to the rear end of the front portion rear fender 35 and with which an oscillating rear wheel 24 can contact in the anterior-posterior direction during traveling. The different color layer 37 has a posterior side gradually enlarging in width.

FIGS. 4A and 4B are schematic cross-sectional views taken along line 4-4 in FIG. 3. The CFRP forming the rear frame 20 constitutes a laminate 70. FIG. 4A is a schematic cross-sectional view cut in a laminating direction (direction extending from above downward in FIG. 4A) for illustrating a structure of the laminate 70. The CFRP having this lamination structure is a plastic reinforced with carbon fibers in which a plurality of carbon fiber layers are laminated one on top of another and are hardened and integrated with each other by a plastic. Such a CFRP is known to offer high rigidity and high strength. Additionally, the carbon fiber is known as a material offering specially high rigidity (but is machinable).

In FIG. 4A, the CFRP laminate 70 forming the front portion rear fender 35 represents a laminate of a plurality of layers from a first layer to an n-th layer laminated one on top of another from the inboard side in the vehicle body toward the outboard side in the vehicle body. The numbers and the letter n indicated on the left of the layers represent ordinal numbers assigned to respective layers. A first layer closest to the inboard side in the vehicle body is a carbon fiber layer 36 composed of carbon fiber woven fabric and a second layer is the different color layer 37 painted in a color different from a color (e.g., black) of the carbon fiber layer 36, for example, yellow.

The different color layer 37 in the present embodiment differs from the carbon fiber layer 36 not only in color, but also in material. Specifically, the different color layer 37 is composed of a woven fabric of aramid fibers (preferably, para-aramid fibers) and has a color different from the color of the carbon fiber layer 36, for example, yellow as contrasted with black of the carbon fiber layer 36. The aramid fibers are known as a high strength material that has a higher extensibility than the carbon fibers and that is resistant to tensile force and hard to snap. The yellow color is illustrative only and the different color layer 37 may be in any other color. Preferably, however, the different color layer 37 is in color that is readily visible and easily noticeable. Alternatively, the different color layer 37 may be composed of carbon fibers, but in a different color. Still alternatively, the different color layer 37 may be composed of any type of fibers other than the aramid fibers and the carbon fibers.

Layers of a third layer onward up to the n-th layer are each the carbon fiber layer 36. It is noted that "n" is any number equal to or greater than 3. The number "n" may be increased or decreased as appropriate depending on required rigidity. Each of these layers are laminated one on top of another to achieve a predetermined number of layers. The laminated layers are then formed into a predetermined shape and a well-known plastic is hardened, so that the laminated layers are integrated with each other. A thermosetting or thermoplastic resin may be used as the plastic material. The forming method may be a dry method or a wet method. The laminate of the present application can be formed by either of the foregoing methods.

The number of layers of the laminate 70, a thickness of each layer and an entire thickness of the laminate 70 are not specified. Consider, for example, a case in which each layer has a thickness of about 0.1 mm and the number of layers is n (n being equal to or greater than 4. Assume also that a thickness T1 of the carbon fiber layer 36 and a thickness T2 of the different color layer 37 are each 0.1 mm. At this time, an entire thickness T of the laminate 70 is n×0.1 mm. A distance L between an outermost layer (an outer surface of the n-th layer) and an outer surface of the different color layer 37 is (n−2)×0.1 mm. The different color layer 37 can be disposed inside a half of the entire thickness T of the laminate 70 when the distance L is set as described above, the different color layer 37 is disposed at the second layer from the inside, and n is equal to or greater than 4.

Preferably, the different color layer 37 is disposed at the second layer from the inside in order to notify a condition of immediately before a wear limit. Most preferably, the distance L between the outermost layer (the outer surface of the n-th layer) and the outer surface of the different color layer 37 is set to 0.8 to 1.2 mm (average 1.0 mm). The foregoing settings result in the following. Specifically, when the entire thickness T in the laminate 70 is formed to be slightly greater than 1.0 mm (less than 2.0 mm at most), an exposed portion 39 of the different color layer 37 is visible upon wear of about 1.0 mm. The exposed portion 39 of the different color layer 37 is visible when the wear is at least half of the entire thickness.

The appearance of the exposed portion 39 represents a condition in which the rear frame 20 issues a notice that the CFRP constituting the laminate 70 (specifically, the rear frame 20) is in a final stage of usability maintaining minimum essential rigidity, thus requiring replacement, specifically, a replacement notice. A user can visually notice the condition through a visual inspection of the rear frame 20. As a result, the user visually recognizes the exposed portion 39 of the different color layer 37 during servicing, so that the user can timely replace the worn exterior part formed of the laminate 70 through the immediate replacement of the rear frame 20 upon the appearance of the exposed portion 39.

It is noted that the different color layer 37 may be on the outside of the second layer from the inside. In this case, however, the different color layer 37 is to be disposed on the inside relative to the half of the thickness in the laminate 70. This arrangement allows replacement to be notified when the laminate 70 is worn down to the half of the original thickness or more, so that premature replacement leaving more than half of the entire thickness T can be avoided.

FIG. 4B is an illustration for illustrating a replacement time advance notice function using the schematic cross-sectional view similar to that of FIG. 4A. FIG. 4B omits depicting the fourth layer to the n-th layer. FIG. 4B depicts a condition in which a lost portion 38 is produced in the carbon fiber layer 36 from, for example, wear caused by impact applied by a piece of flying gravel 60 through use over an extended period of time and the lost portion 38 reaches the third layer. Formation of the lost portion 38 reaches the carbon fiber layer 36 of the inside third layer and the lost portion 38 advances toward the different color layer 37 of the second layer. An outer surface of the different color layer 37 is eventually exposed and the exposed portion 39 of the different color layer 37 is visible.

The exposed portion 39 forms part of the different color layer 37 and the different color layer 37 having a color of yellow, for example, is noticeable against the carbon fiber layer 36 (e.g., black) that surrounds the different color layer 37. Thus, the exposed portion 39 can be quickly recognizable against an outside portion. The exposed portion 39 serves as the replacement time advance notice function. The rear frame 20 can be replaced on the basis of determination made of a service limit upon visual recognition of the exposed portion 39. Additionally, the replacement can be performed when the carbon fiber layer 36 as the first layer on the innermost side remains intact, so that the replacement can be performed at appropriate timing immediately before a breakdown occurs, which is economically advantageous. Additionally, the disposition of the different color layer 37 that is resistant to wear in the second layer delays loss of the first layer, thus allowing for time before replacement.

The engine guard 21 will be described below with reference to FIGS. 5 to 8.

Figure 5:
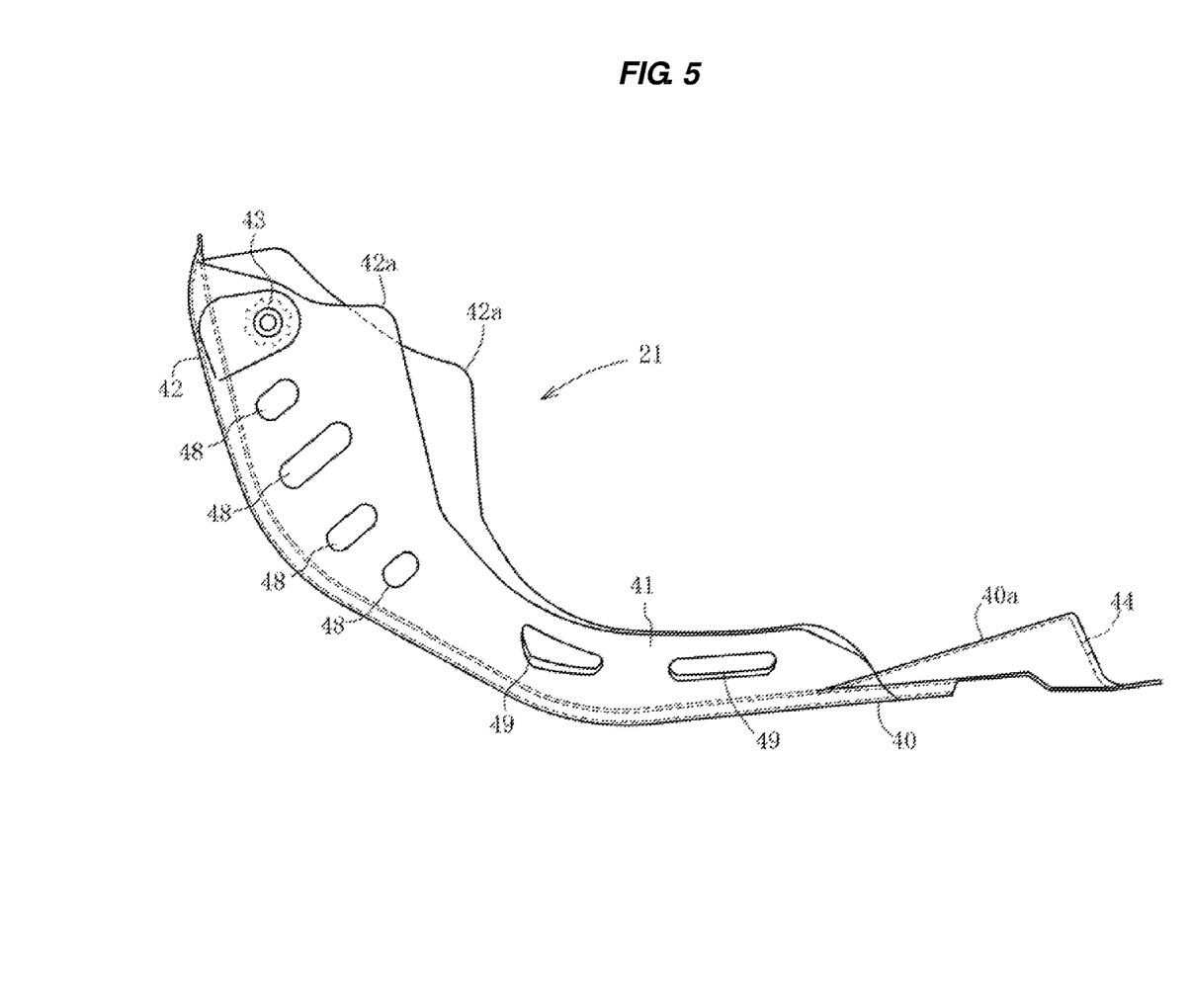
FIG. 5 is a side elevational view depicting an engine guard (exterior part) according to the embodiment of the present invention.
Figure 6:
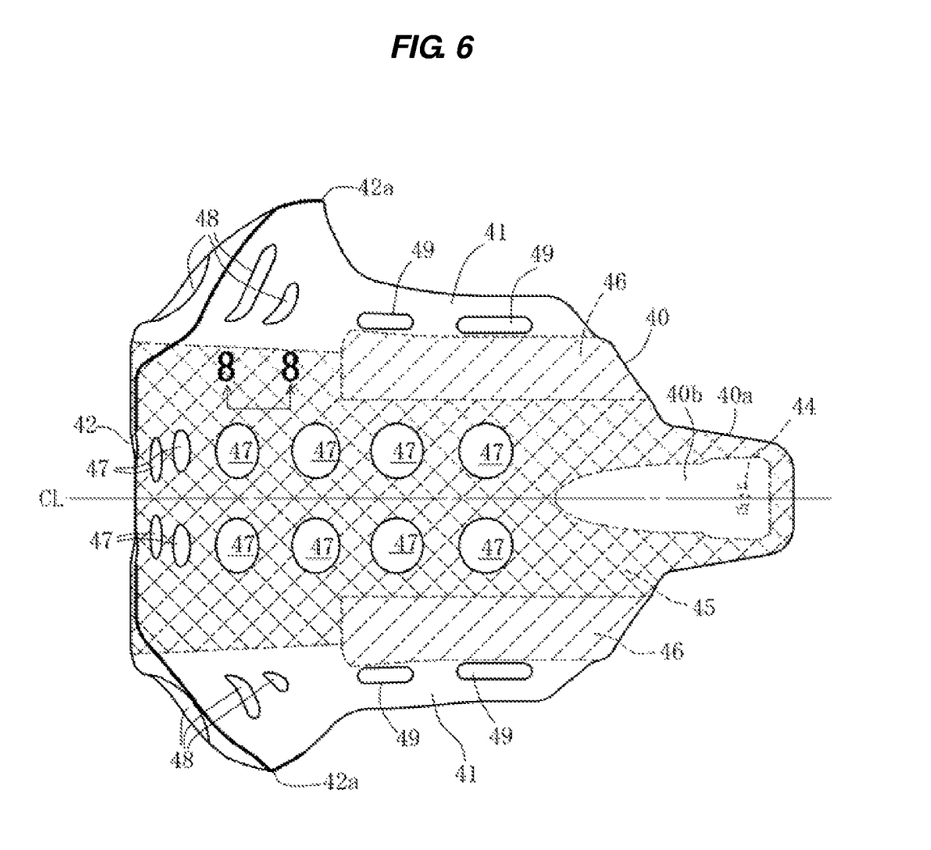
FIG. 6 is a plan view depicting the engine guard.
Figure 7:
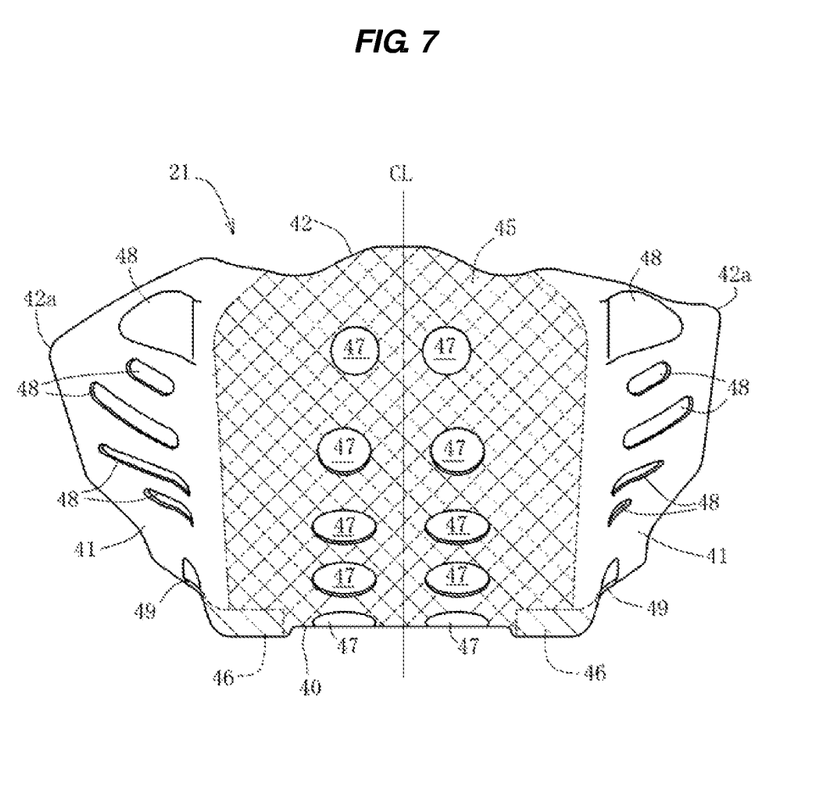
FIG. 7 is a front elevational view depicting the engine guard.

The engine guard 21 includes a bottom portion 40, left and right lateral portions 41, and a front portion 42 integrally formed with each other. The bottom portion 40 is superimposed over a vehicle body centerline CL at the center in the vehicle body and extends long in the anterior-posterior direction below the crankcase 11b. The left and right lateral portions 41 are disposed on either lateral sides of the bottom portion 40. The lateral portions 41 bend upwardly to thereby extend along left and right lower portions of the crankcase 11b. The front portion 42 covers an anterior lower portion of the crankcase 11b from the front side.

The front portion 42 is formed to be curved upwardly and continuous from a front end portion of the bottom portion 40. The front portion 42 and the lateral portions 41 are also continuous with each other via bulged portions 42a that bulge laterally from the lateral portions 41. The left and right bulged portions 42a each have a boss 43 with which the corresponding bulged portion 42a is fastened and fixed to the down frame 18. The bottom portion 40 has a rear end portion constituting an extended portion 40a that extends long along the vehicle body centerline CL toward the rear than the lateral portions 41 do. The extended portion 40a is fastened and fixed to the lower frame 19 by way of a boss 44 disposed in the extended portion 40a along the vehicle body centerline CL.

The engine guard 21 is formed of the CFRP having a total of six layers or more. As depicted in FIG. 6, the CFRP of the engine guard 21 is a combination of a total-six-layer portion 45, a total-seven-layer portion, and a total-nine-layer portion 46. A reference symbol for the total-seven-layer portion is omitted and the total-seven-layer portion is any portion other than the total-six-layer portion 45 and the total-nine-layer portion 46.

The total-six-layer portion 45 is formed mainly in the bottom portion 40 to extend long into a band shape extending in the anterior-posterior direction. It should, however, be noted that the total-six-layer portion 45 has a front portion expanding slightly laterally to thereby be continuous with the front portion 42 and to extend centrally up to an upper end of the front portion 42 (see FIG. 7). The total-six-layer portion 45 has a rear end including a partial total-seven-layer portion of a localized area 40b nearby the boss 44 in the extended portion 40a (see FIG. 6). The total-nine-layer portion 46 is formed on the bottom portion 40 at each lateral side of the total-six-layer portion 45 and at a position posterior to the corresponding bulged portion 42a. Reference symbol 47 denotes a cavity hole, reference symbol 48 denotes a recess, and reference symbol 49 denotes a cavity hole.

Reference is made to FIG. 8. A cross-sectional configuration of the CFRP constituting the engine guard 21 is identical, from the first layer to the third layer, to the configuration depicted in FIG. 4A. The CFRP is a laminate composed of the carbon fiber layer 36, the different color layer 37, and the carbon fiber layer 36. The CFRP, however, includes a sound insulation layer 50 in an (n−1)-th layer that is one layer inside the n-th layer that is the outermost layer. The sound insulation layer 50 is a continuous sheet including an elastic material having a sound insulation property, such as rubber. The sound insulation layer 50 is sandwiched between, and integrated with, the carbon fiber layer 36 as the n-th layer and the carbon fiber layer 36 as the n−2th layer. The sound insulation layer 50 disposed in the layer second from the outside is illustrative only and is required only to be disposed between the different color layer 37 and the carbon fiber layer 36 as the outermost layer.

The engine guard 21, having a lamination structure including a plurality of layers, has high rigidity and thus offers a physical property favorable as the engine guard 21 that is subject to impact from, for example, flying gravel 60. Because of a hard sheet form involved, however, the engine guard 21 produces loud noise when hit by a piece of flying gravel 60, for example. The lamination of the sound insulation layer 50 as in the present application causes tapping noise produced upon collision of the piece of flying gravel 60 to travel as depicted by the arrow c and to be absorbed by the sound insulation layer 50, so that such noise can be reduced.

Moreover, the disposition of the sound insulation layer 50 in the (n−1)-th layer results in the sound insulation layer 50 being guarded by the carbon fiber layer 36 in the n-th layer. The sound insulation layer 50 is thus hard to be worn or damaged for improved durability. Furthermore, the sound insulation layer 50 is disposed close to the source of the noise and thus can absorb noise quickly. Additionally, the sound insulation layer 50, because being formed into a continuous sheet, extends generally thinly to have a large volume for efficient sound insulation performance and reduced weight.

Operation and effects in the present embodiment will be described below.

As depicted in FIG. 3, the rear frame 20 is formed of the CFRP composed of the laminate 70 including the carbon fiber layer 36. The rear frame 20 can thus be built lightweight and to offer high rigidity. Additionally, the CFRP includes the total-six-layer portion 45, the total-seven-layer portion, and the total-nine-layer portion 46, varied depending on different sites, so that a rigidity distribution can be optimized according to the use of the exterior part.

As depicted in FIG. 4A, the laminate 70 includes the different color layer 37 disposed there inside. When the carbon fiber layer 36 as the outer side layer of the laminate 70 is shaved off by, for example, collision of a piece of flying gravel 60 as depicted in FIG. 4B, the different color layer 37 disposed inside the carbon fiber layer 36 is exposed, so that the exposed portion 39 of the different color layer 37 can be immediately visually recognized. As a result, the user can recognize that the rear frame 20 (exterior part) is thin to have degraded rigidity or strength, requiring replacement. This enables replacement of the exterior part at appropriate timing. The engine guard 21 that corresponds to another exterior part in the present application similarly has this replacement time notification function.

The different color layer 37 is formed of the aramid fibers that are hardly torn off. This results in a tear-resistant functional layer being disposed in the laminate 70. The different color layer 37 thus prevents loss from being readily produced in the CFRP and serves an effective composite reinforcement material with the CFRP. Moreover, the different color layer 37, being formed of the aramid fibers that are hardly torn off, delays advance of the lost portion 38 deeper from the different color layer 37, thus giving time allowance for replacement after the exposed portion 39 has been exposed. Additionally, the aramid fibers that are easily affected by water and ultraviolet rays are embedded in and integrated with the laminate 70. This improves water resistance and ultraviolet resistance performance of the different color layer 37.

The different color layer 37 is disposed inside a half of the entire thickness T of the laminate 70 in the thickness direction of the laminate 70. Thus, when the laminate 70 is shaved to half or more in the thickness direction, the exposed portion 39 of the different color layer 37 is exposed to thereby notify the user of the replacement timing. Timing at which the replacement notice is given is not too early and replacement can be performed at economically favorable timing.

Moreover, the distance L between the outermost layer (the outer surface of the n-th layer) and the outer surface of the different color layer 37 is set to be 0.8 to 1.2 mm (average 1.0 mm). For an exterior part having the entire thickness T of slightly greater than 1.0 mm (approximately, 1.0 to 2.0 mm) (the thickness that is generally frequently used), the different color layer 37 can be disposed on the innermost side of the laminate 70. As a result, the exposed portion 39 of the different color layer 37 is exposed when about 1.0 mm is shaved off the outermost surface of the rear frame 20 (exterior part), so that the user can visually recognize the exposed portion 39 to thereby determine that the rear frame 20 requires replacement.

This notification timing corresponds to a condition in which the rear frame 20 has been shaved off to be close to a service limit. The user thus can perform replacement at the best possible timing. Moreover, the different color layer 37 is disposed in the layer second from the inside aside from the carbon fiber layer 36 on the innermost side. This arrangement delays most the notification timing, thereby enabling use of the rear frame 20 up to the service limit at which the last carbon fiber layer 36 is left.

As depicted in FIG. 3, the different color layer 37 is disposed continuously along the anterior-posterior direction of the front portion rear fender 35. This position at which the different color layer 37 is disposed falls within a range against which the flying gravel 60 tends to collide. Specifically, when the rear wheel 24 picks up a piece of gravel and throw the gravel into the air during traveling, the gravel becomes the flying gravel 60 to fly in a tangential direction on the outer circumference of the rear wheel 24. The flying gravel 60 then collides against the front portion rear fender 35 in the anterior-posterior direction, thus causing the front portion rear fender 35 to wear in the anterior-posterior direction. The different color layer 37 disposed in this range continuously along the anterior-posterior direction, however, can prevent loss that is produced as a result of wear from collision of the flying gravel 60 during traveling from expanding.

The portion in which the different color layer 37 is disposed in the front portion rear fender 35 (and the rear portion rear fender 27) is subject to contact by a tire of the rear wheel 24 during traveling. The contact by the tire causes the front portion rear fender 35 to wear in the circumferential direction (specifically, the anterior-posterior direction). Thus, disposing the different color layer 37 continuous in the circumferential direction can prevent loss from occurring due to wear as a result of the contact with the tire during traveling. The disposition of the different color layer 37 as described above is effective particularly in the off-road motorcycle in which the rear wheel 24 undergoes a large up and down stroke and thus the tire of the rear wheel 24 has a greater chance of contacting the rear fender.

The engine guard 21 (exterior part) depicted in FIGS. 5 to 7 includes the sound insulation layer 50 in addition to the elements of the lamination structure depicted in FIGS. 4A and 4B. As with the rear frame 20, the engine guard 21 also has the replacement time notification function through the use of the different color layer 37 disposed therein. As depicted in FIG. 8, the sound insulation layer 50 is disposed in the layer inside the carbon fiber layer 36 of the outermost layer, specifically, in the layer second from the outermost layer (specifically, the second layer from the outside). The sound insulation layer 50, while being protected by the outermost carbon fiber layer 36, includes the elastic material to thereby be able to reduce noise that can otherwise be heard when gravel hits against the outer surface of the engine guard 21.

Additionally, the sound insulation layer 50 is formed into a continuous sheet including the elastic material. The sound insulation layer 50 thus can have a large volume, while retaining a thin entire thickness. The sound insulation layer 50 thus exhibits favorable sound insulation performance.

Additionally, the exterior parts including the rear frame 20 and the engine guard 21 that are disposed on the outermost side in the off-road motorcycle (off-road vehicle) are formed of the lightweight CFRP composed of the laminate 70 depicted in FIGS. 4A and 4B or 8 and have the replacement time notification function and sound insulation property. Thus, mass of the off-road vehicle is concentrated on the central portion of the vehicle body for favorable operability. Various functions can also be achieved.

It will be understood that the embodiment described above is not intended to limit the present invention and various changes in form and detail may be made therein without departing from the spirit and scope of the invention. For example, the structure of the laminate 70 depicted in FIG. 4A may be applied to any exterior parts other than the rear frame 20. For example, the structure may be applied to the front fender 15 (FIG. 1). For a rear fender that integrates the front portion rear fender 35 with the rear portion rear fender 27, the structure of the laminate 70 depicted in FIG. 4A can be applied to this rear fender. When the structure of the laminate 70 is applied to the front fender and the rear fender, the different color layer 37 is to be disposed continuously along the circumference direction of the front wheel 13 or the rear wheel 24.

Additionally, the lamination structure depicted in FIG. 8, specifically, the lamination structure including the laminate 70 that includes the different color layer 37, to which the sound insulation layer 50 is added, may be disposed in any exterior part other than the engine guard, e.g., the rear frame 20, the front fender 15, and the side cowls 29 (FIG. 1).

Figure 9:
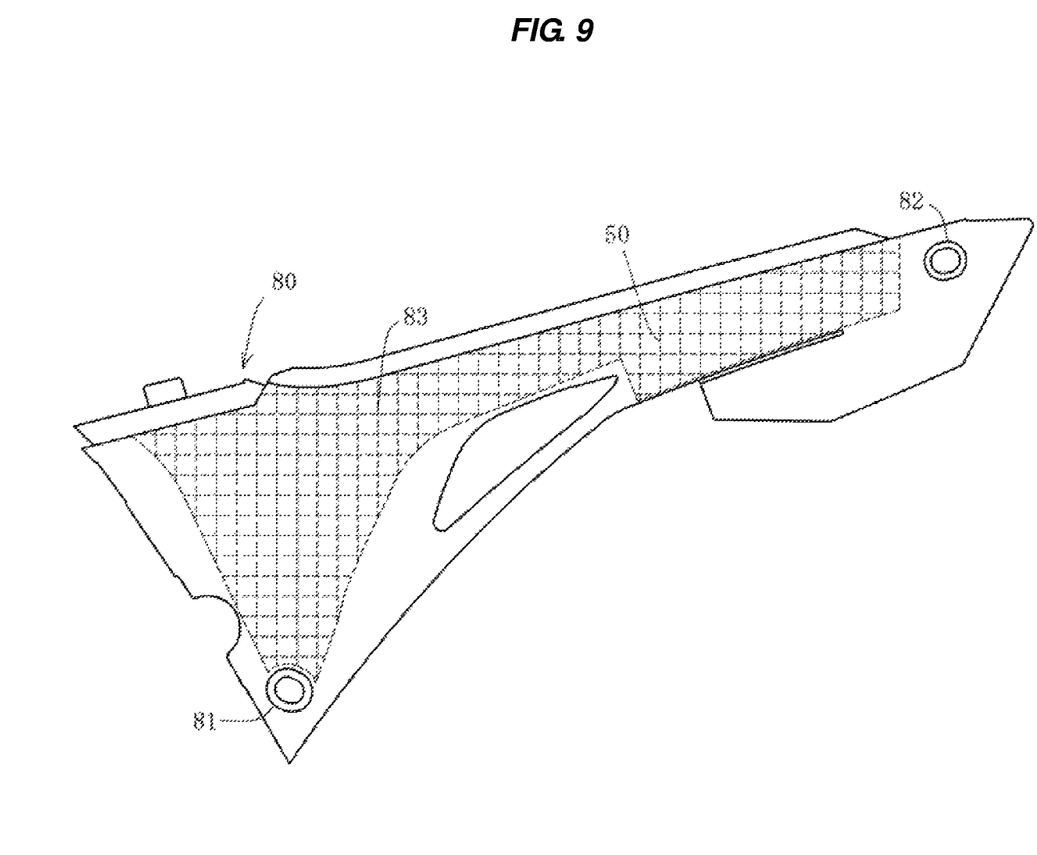
FIG. 9 is a side elevational view depicting a side cover as another example of an exterior part.

For a configuration in which a traditional metal pipe member is used for the seat rail mounted in place of the rear frame 20, a side cover may be provided as an exterior part for covering the outside of the seal rail. An example of this configuration is depicted in FIG. 9. FIG. 9 is a side elevational view of a side cover 80. The side cover 80 is mounted on the center frame 17 (FIG. 1) via a boss 81 at a front end portion thereof and mounted on the seat rail (not depicted) via a boss 82 at a rear end portion thereof. A main unit 83 is relatively flat and has a wide area. The main unit 83 is disposed long in the anterior-posterior direction to thereby cover an inferior area of the seat from sided of the vehicle body. The side cover 80 is formed of a plastic and the lamination structure including the sound insulation layer depicted in FIG. 8 may be applied to this main unit 83.

In this case, the cross-hatched sound insulation layer 50 is formed to be continuously long in the anterior-posterior direction. Such an arrangement allows the sound insulation layer to absorb loud noise that would otherwise be produced from the large flat surface portion.

Additionally, the carbon fibers forming the CFRP and the aramid fibers forming the different color layer 37 do not necessarily have to be a woven fabric. The carbon fibers and the aramid fibers may be a knitted or nonwoven fabric, or even a bulk form. The type of vehicle to which the present application is applied is not only the off-road vehicle, but also saddled vehicles for various uses including on-road motorcycles.

What is claimed is:

1. An exterior part of a saddled vehicle, the exterior part being formed of a fiber reinforced plastic to constitute an outer surface of the saddled vehicle, the fiber reinforced plastic constituting the exterior part comprising:
    the fiber reinforced plastic formed by a laminate with a plastic,
    the laminate including a plurality of carbon fiber layers hardened by the plastic,
    wherein the laminate comprises:
        a different color layer disposed between the carbon fiber layers, the different color layer having a color different from a color of the carbon fiber layers, and
        a sound insulation layer including an elastic material, the sound insulation layer disposed, in a thickness direction of the laminate, between an outermost one of the carbon fiber layers and the different color layer.

2. The exterior part of a saddled vehicle according to claim 1, wherein the different color layer is formed of aramid fibers.

3. The exterior part of a saddled vehicle according to claim 2, wherein the different color layer is disposed at a position 0.8 mm to 1.2 mm inside an outermost surface of the laminate.

4. The exterior part of a saddled vehicle according to claim 2, wherein the saddled vehicle is an off-road vehicle.

5. The exterior part of a saddled vehicle according to claim 4, wherein
    the exterior part is an engine guard that includes a bottom portion for covering an area inferior to an engine of the saddled vehicle and a lateral portion extending upwardly from the bottom portion, and
    the different color layer is disposed continuously along an entire length in an anterior-posterior direction of the bottom portion.

6. The exterior part of a saddled vehicle according to claim 4, wherein
    the exterior part is a fender that covers a wheel of the saddled vehicle, and
    the different color layer is disposed continuously along a predetermined length in a circumferential direction of the fender.

7. The exterior part of a saddled vehicle according to claim 1, wherein the different color layer is disposed at a position 0.8 mm to 1.2 mm inside an outermost surface of the laminate.

8. The exterior part of a saddled vehicle according to claim 1, wherein the sound insulation layer is a continuous sheet.

9. The exterior part of a saddled vehicle according to claim 8, wherein the saddled vehicle is an off-road vehicle.

10. The exterior part of a saddled vehicle according to claim 9, wherein
    the exterior part is an engine guard that includes a bottom portion for covering an area inferior to an engine of the saddled vehicle and a lateral portion extending upwardly from the bottom portion, and
    the different color layer is disposed continuously along an entire length in an anterior-posterior direction of the bottom portion.

11. The exterior part of a saddled vehicle according to claim 9, wherein
    the exterior part is a fender that covers a wheel of the saddled vehicle, and
    the different color layer is disposed continuously along a predetermined length in a circumferential direction of the fender.

12. The exterior part of a saddled vehicle according to claim 1, wherein the saddled vehicle is an off-road vehicle.

13. The exterior part of a saddled vehicle according to claim 12, wherein
    the exterior part is an engine guard that includes a bottom portion for covering an area inferior to an engine of the saddled vehicle and a lateral portion extending upwardly from the bottom portion, and
    the different color layer is disposed continuously along an entire length in an anterior-posterior direction of the bottom portion.

14. The exterior part of a saddled vehicle according to claim 12, wherein
    the exterior part is a fender that covers a wheel of the saddled vehicle, and
    the different color layer is disposed continuously along a predetermined length in a circumferential direction of the fender.

15. A fender configured for use as a component of a saddled off-road vehicle in which a wheel may intermittently contact an interior surface of the fender during off-road travel, said fender being formed of a fiber reinforced plastic comprising a laminate combined with a plastic, the laminate including a plurality of carbon fiber layers hardened by the plastic, wherein the laminate comprises:
    a different color layer disposed between the carbon fiber layers, the different color layer being formed of aramid fibers and having a color different from a color of the carbon fiber layers, and
    a sound insulation layer including an elastic material, the sound insulation layer disposed, in a thickness direction of the laminate, between an outermost carbon fiber layer, configured to be disposed on an interior surface of the fender facing toward the wheel, and the different color layer.

16. An engine guard configured for use as a component of a saddled off-road vehicle in which the engine guard includes a bottom portion for covering an area below an engine of the saddled vehicle, said engine guard being formed of a fiber reinforced plastic comprising a laminate combined with a plastic, the laminate including a plurality of carbon fiber layers hardened by the plastic, wherein the laminate comprises:
    a different color layer disposed between the carbon fiber layers, the different color layer being formed of aramid fibers and having a color different from a color of the carbon fiber layers, and
    a sound insulation layer including an elastic material, the sound insulation layer disposed, in a thickness direction of the laminate, between an outermost carbon fiber layer and the different color layer.

* * * * *